(12) United States Patent
Lin

(10) Patent No.: US 6,974,051 B1
(45) Date of Patent: Dec. 13, 2005

(54) CARAFE CONTENT IDENTIFICATION MARKING SYSTEM

(76) Inventor: Shin-Shuoh Lin, 27022 Falling Leaf Dr., Laguna Hills, CA (US) 92653

( * ) Notice: Subject to any disclaimer, the term of this patent is extended or adjusted under 35 U.S.C. 154(b) by 273 days.

(21) Appl. No.: 10/408,791

(22) Filed: Apr. 8, 2003

(51) Int. Cl.[7] .................................................. B67D 5/06
(52) U.S. Cl. ........................ 222/25; 222/23; 222/131; 222/465.1; 206/459.5
(58) Field of Search ............................ 222/23, 25, 131, 222/465.1, 475.1, 459.5

(56) References Cited

U.S. PATENT DOCUMENTS

| | | | |
|---|---|---|---|
| 5,158,793 A * | 10/1992 | Helbling | 426/231 |
| 5,477,979 A | 12/1995 | Goessling et al. | |
| 5,531,353 A | 7/1996 | Ward et al. | |
| D396,381 S | 7/1998 | Chung | |
| D410,364 S | 6/1999 | Ramirez et al. | |
| D418,013 S | 12/1999 | Fujii | |
| D420,550 S | 2/2000 | Elshof | |
| 6,301,961 B1 | 10/2001 | Rolfes et al. | |
| 6,425,496 B1 * | 7/2002 | Schulein | 222/23 |
| 6,561,390 B2 * | 5/2003 | Boyte et al. | 222/475.1 |
| 6,736,295 B2 * | 5/2004 | Lin et al. | 222/475.1 |
| 2002/0134789 A1 * | 9/2002 | Lin | 220/758 |
| 2003/0209563 A1 * | 11/2003 | Lin et al. | 222/131 |

* cited by examiner

Primary Examiner—Michael Mar
Assistant Examiner—Sonia N. Khaira
(74) Attorney, Agent, or Firm—Gordon K. Anderson

(57) ABSTRACT

A carafe content identification marking system is taught that is used for designating the contents of a liquid in a carafe. The preferred carafe (20) is the counter top, double wall vacuum sealed, high flow type having an open handle. (22). The stopper cap (24) of the carafe has a selected identification color representing the contents of the carafe. A removable handle grip (38) and thumb rest (40) are disposed over the handle of the carafe and also have the same selected identification color as the stopper cap. An identification marker in the form of a snap-in insert (42) is attached to the carafe having the same selected identification color as the stopper cap in addition to indicia designating in writing, the contents of the carafe. The color combination and indicia readily indicates, at a casual glance, the type of liquid stored within.

19 Claims, 3 Drawing Sheets

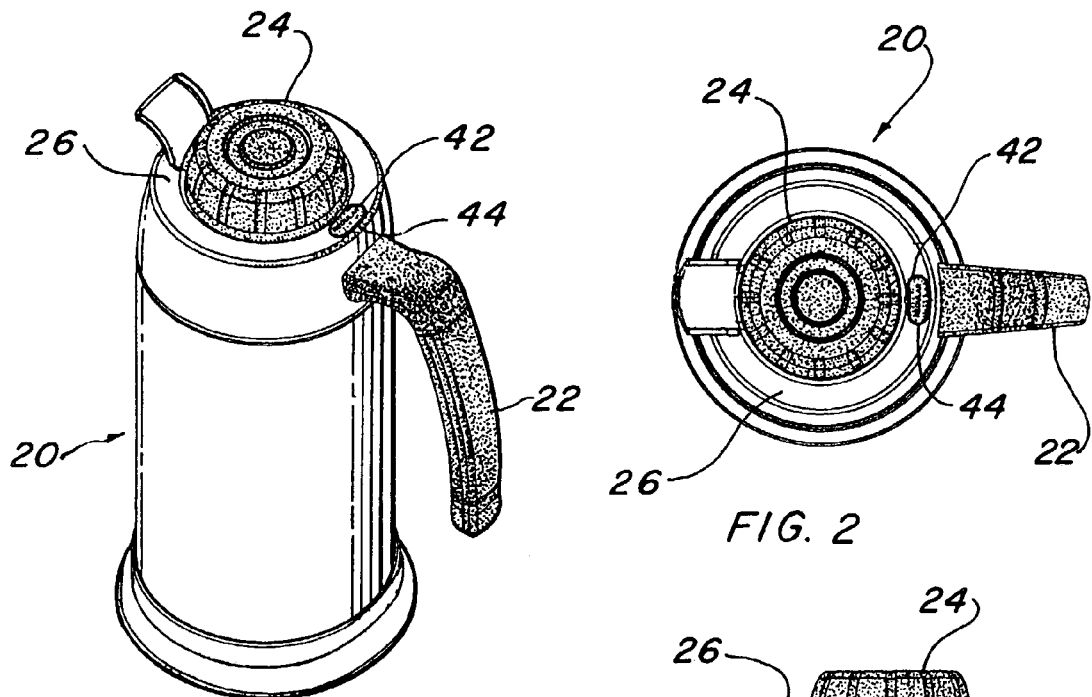
FIG. 1
FIG. 2
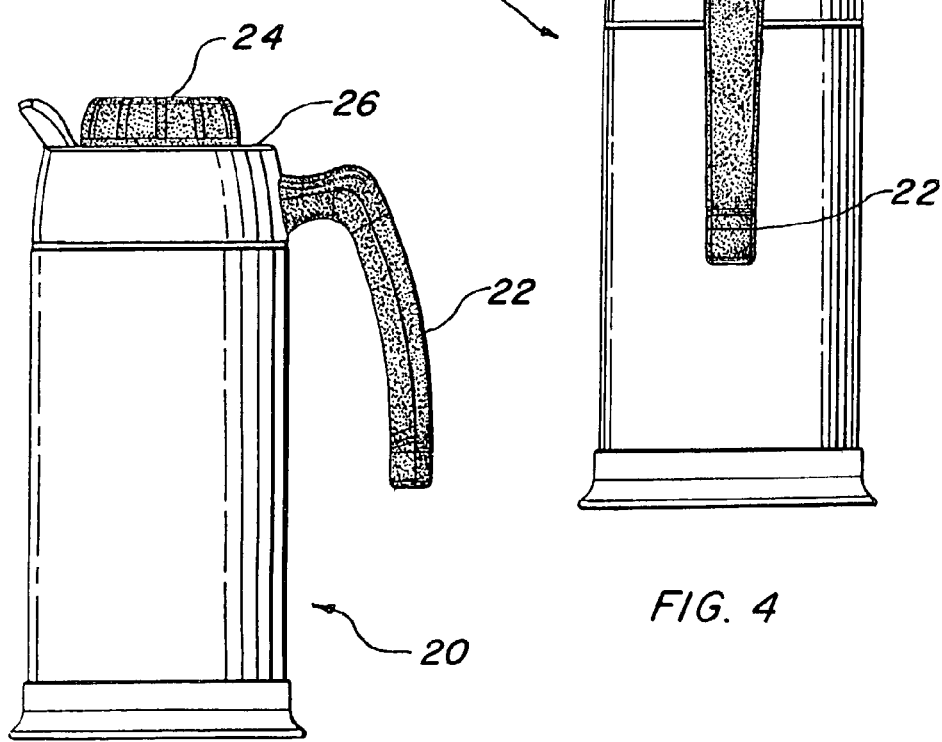
FIG. 3
FIG. 4

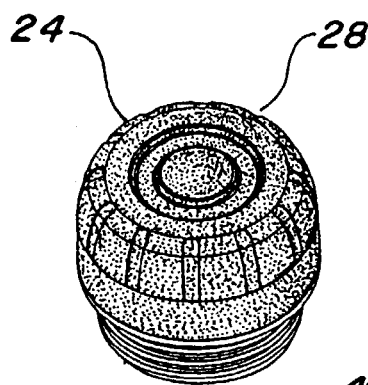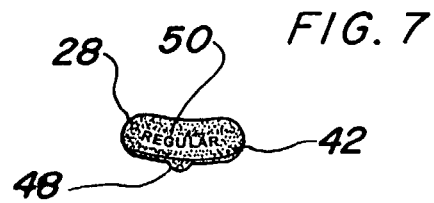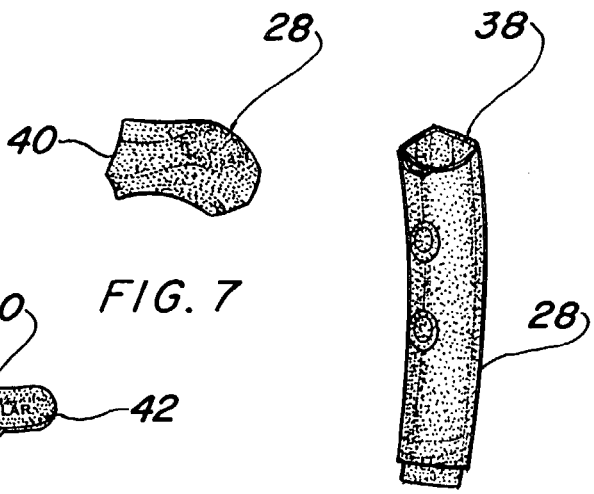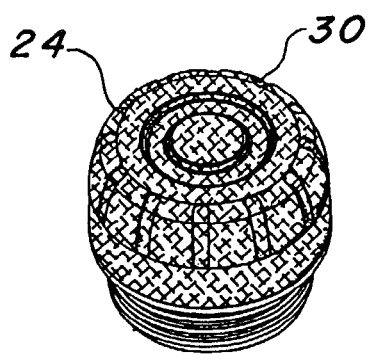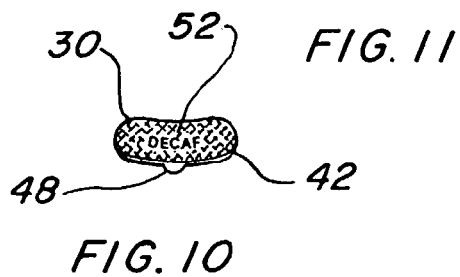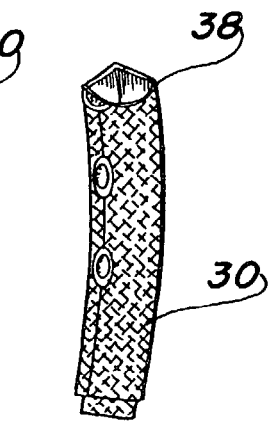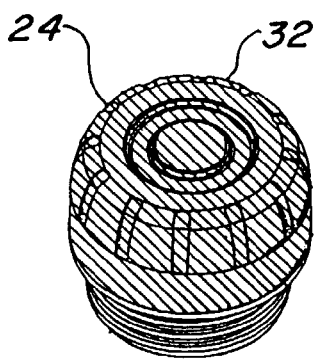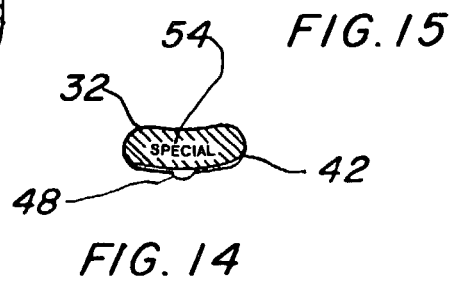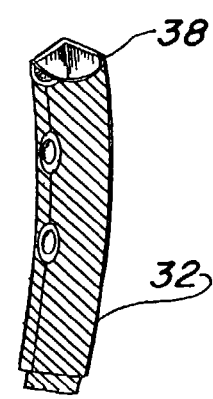

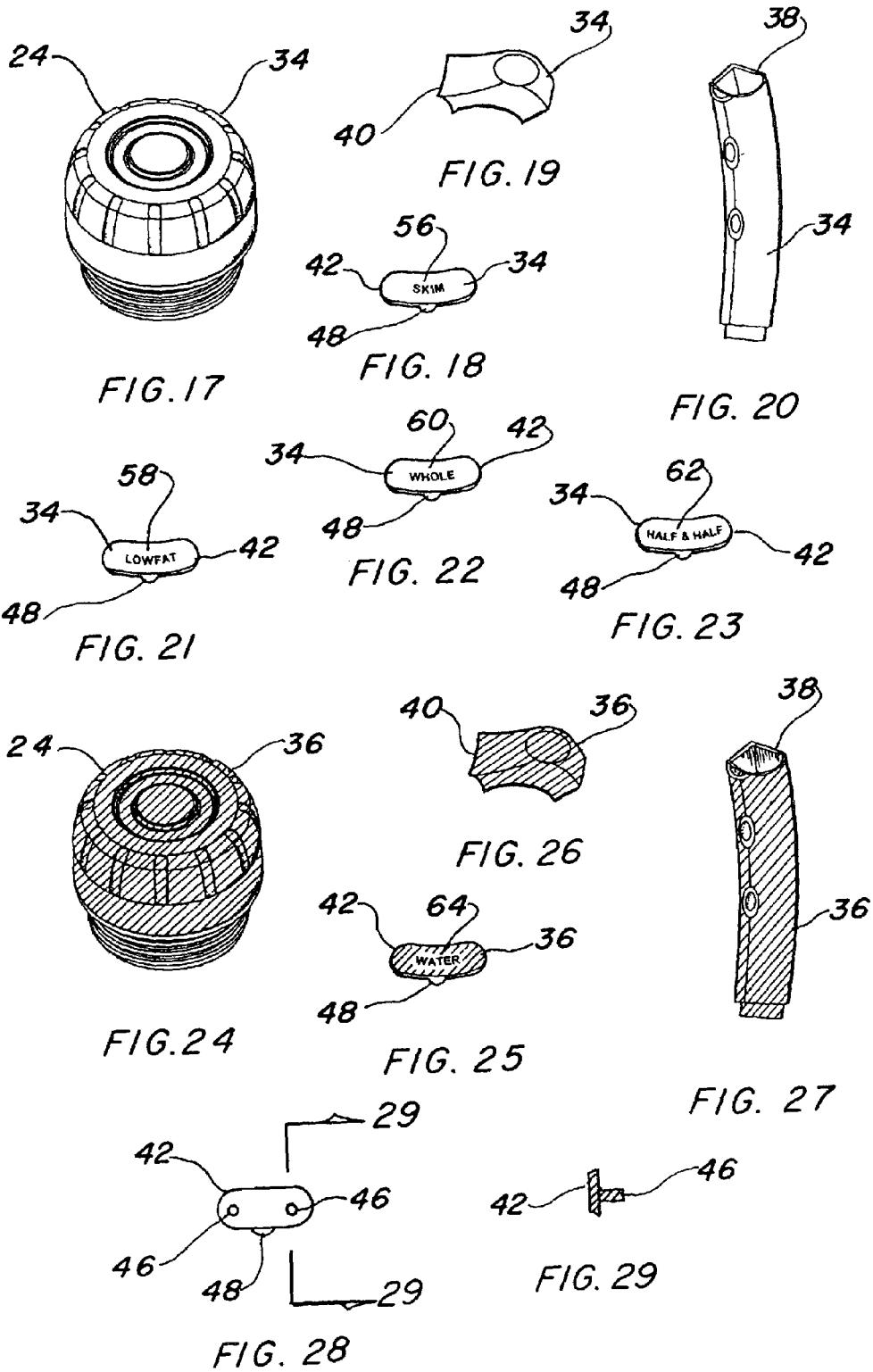

CARAFE CONTENT IDENTIFICATION MARKING SYSTEM

TECHNICAL FIELD

The present invention relates to a marking system in general. More specifically to identification marking for a carafe, such that the contents of the liquid contained therein may be easily identified by both a recognizable color and indicia.

BACKGROUND ART

Previously, those within the carafe manufacturing industry have failed to address the issue of marking a specific counter top carafe to indicate the type of liquid that is used in conjunction with the serving vessel.

It should be noted that the prior art listed below did not disclose patents that possess the novelty of the instant invention; however as an overview the following U.S. patents are considered related:

| U.S. Pat. No. | Inventor | Issue Date |
| --- | --- | --- |
| D 396,381 | Chung | Jul. 28, 1998 |
| D 410,364 | Ramirez et al. | Jun. 1, 1999 |
| D 418,013 | Fujii | Dec. 28, 1999 |
| D 420,550 | Elshof | Feb. 15, 2000 |
| 5,477,979 | Goessling et al. | Dec. 26, 1995 |
| 5,531,353 | Ward et al. | Jul. 2, 1996 |
| 6,301,961 | Rolfes et al. | Oct. 16, 2001 |

Chung in U.S. design Pat. No. D 396,381 illustrates a travel mug with no indicia or color distinction indicating its contents.

Design Pat. No. D 410,364 issued to Ram irez et al. is for a convertible travel cup and bottle apparently having no marking or color indicating its contents.

Fujii in U.S. design Pat. No. D 418,013 discloses a classic mug beverage container with the lack of indication or color representing its contents.

Elshofin U.S. design Pat. D No. 420,550 illustrates a travel mug however it lacks any suggestion of its contents in either color or marking.

U.S. Pat. No. 5,477,979 issued to Goessling et al. discloses a beverage mug having a lid and a sipping liner. The lid is fitted to the liner while the liner ins on the mouth of the vessel simply by placing the lid over the liner and pressing downwardly.

Ward et al. in U.S. Pat. No. 5,531,353 is for a drinking cup device that has an open top and a separate base. The invention also has a removable lid that receives cup base on one side of the lid.

In U.S. Pat. No. 6,301,961 of Rolfes et al. an insulated beverage carafe with volume indicator is presented for use in conjunction with an automatic drip coffee maker. The carafe includes a gauge to determine when the container is empty. This gauge is removable for washing but it is noted that the patent is silent regarding any special markings or indication of its contents.

DISCLOSURE OF THE INVENTION

For individual use, there is little need for identification marking a carafe, as the user is completely aware of what has been placed within the liquid containing vessel. This liquid may change as to the necessity of the user particularly with a vacuum sealed carafe as either hot or cold beverages may be stored and served however the user is still well aware of what is stored inside. The use of carafes has changed in the past few years when it comes to commercial establishments such as specialty coffee shops and so called coffee houses where many different types of coffee are served and milk and cream are added to enhance the taste. Multiple carafes are many times used side by side having different types of coffee and creamers with the establishments attempting to solve the problem by placing tape on the outside of the carafe and labeling the contents by hand. Others have used embossed tape with the name of the contents spelled out. While the end result has been obtained, the overall appearance of the carafe is jeopardized and its attractiveness is tainted.

It is therefore the primary object of the invention to satisfy the need by clearly identifying each carafe in such a manner that a customer may easily identify the contents at a glance and still retain its inherent attractive appearance.

An important object of the invention is that the physical image of the carafe is not compromised as four separate indications are subtly used in combination. The same color is employed in the handle, both the grip and thumb rest, and the stopper cap utilizes the same hue as well as a snap-in insert marker that is not only similarly colored but has indicia in the form of writing that spells out the type of liquid contained in the vessel.

Another object of the invention is that all of the elements are removable and easy to exchange. As such the carafe for each purpose is identical which allows full interchangeability when one becomes worn out or has suffered surface damage. The stopper cap is simply screwed on and if the wrong one is inadvertently used it will become apparent immediately as the colors do not match. The handle grip and thumb rest are made of resilient SANTOPRENE™ rubber and are pried open easily fitting over the handle and remain in place securely. The snap-in marker is also easily removed and replaced and the use of an indented cavity precludes unintentional loss.

Still another object of the invention is that color is visible from a distance and yet the combination of cap and handle along with the stainless steel body, black base and top are not gaudy, but are in reality very pleasing and attractive to the eye, which is a far cry from the hand marked tape or obvious, rather distasteful, strip tape marker.

Yet another object of the invention is that specific colors represent the contents which are obviously significant. When the invention is used by a chain of establishments the clientele become accustomed to the color representation. The colors of the invention have been carefully selected to represent as closely as possible the liquid contents such as black for regular coffee and white for milk or cream.

A further object of the invention is that sets may be marketed for each color and type or could be sold individually as replacements.

A final object of the invention is that the identification system is attractive, stylish and somewhat discrete, further it adds little to the cost of the carafe.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment of the carafe content identification marking system installed on a counter top vacuum carafe.

FIG. 2 is a top plan view of the preferred embodiment of the carafe with the content identification marking system installed.

FIG. 3 is a right side elevation view of the preferred embodiment of the carafe with the content identification marking system installed.

FIG. 4 is a rear elevation view of the preferred embodiment of the carafe with the content identification marking system installed.

FIG. 5 is a partial isometric view of the stopper cap in the black color designating regular coffee as the contents of the carafe.

FIG. 6 is a partial isometric view of the snap-in insert identification marker in the black color designating regular coffee as the contents of the carafe.

FIG. 7 is a partial isometric view of the removable thumb rest in the black color designating regular coffee as the contents of the carafe.

FIG. 8 is a partial isometric view of the removable handle grip in the black color designating regular coffee as the contents of the carafe.

FIG. 9 is a partial isometric view of the stopper cap in the orange color designating decaffeinated coffee as the contents of the carafe.

FIG. 10 is a partial isometric view of the snap-in insert identification marker in the orange color designating decaffeinated coffee as the contents of the carafe.

FIG. 11 is a partial isometric view of the removable thumb rest in the orange color designating decaffeinated coffee as the contents of the carafe.

FIG. 12 is a partial isometric view of the removable handle grip in the orange color designating decaffeinated coffee as the contents of the carafe.

FIG. 13 is a partial isometric view of the stopper cap in the green color designating a special blend of coffee as the contents of the carafe.

FIG. 14 is a partial isometric view of the snap-in insert identification marker in the green color designating a special blend of coffee as the contents of the carafe.

FIG. 15 is a partial isometric view of the removable thumb rest in the green color designating a special blend of coffee as the contents of the carafe.

FIG. 16 is a partial isometric view of the removable handle grip in the green color designating a special blend of coffee as the contents of the carafe.

FIG. 17 is a partial isometric view of the stopper cap in the white color designating skim milk as the contents of the carafe.

FIG. 18 is a partial isometric view of the snap-in insert identification marker in the white color designating skim milk as the contents of the carafe.

FIG. 19 is a partial isometric view of the removable thumb rest in the white color designating milk as the contents of the carafe.

FIG. 20 is a partial isometric view of the removable handle grip in the white color designating milk as the contents of the carafe.

FIG. 21 is a partial isometric view of the snap-in insert identification marker in the white color designating lowfat milk as the contents of the carafe.

FIG. 22 is a partial isometric view of the snap-in insert identification marker in the white color designating whole milk as the contents of the carafe.

FIG. 23 is a partial isometric view of the snap-in insert identification marker in the white color designating half milk and half cream as the contents of the carafe.

FIG. 24 is a partial isometric view of the stopper cap in the brown color designating water as the contents of the carafe.

FIG. 25 is a partial isometric view of the snap-in insert identification marker in the brown color designating water as the contents of the carafe.

FIG. 26 is a partial isometric view of the removable thumb rest in the brown color designating water as the contents of the carafe.

FIG. 27 is a partial isometric view of the removable handle grip in the brown color designating water as the contents of the carafe.

FIG. 28 is a bottom (underside) view of the snap-in insert identification marker.

FIG. 29 is a cross sectional view taken along lines 29—29 of FIG. 28.

BEST MODE FOR CARRYING OUT THE INVENTION

The best mode for carrying out the invention is presented in terms of a preferred embodiment for the carafe content identification marking system that enables designation of the contents of a liquid to be contained within a carafe. This preferred embodiment is shown in FIGS. 1 thorough 29 and is comprised of a counter top vacuum carafe 20 of the high flow type that includes a handle 22 and a double wall vacuum sealed air space. The entire carafe 20 is shown pictorially illustrated in FIGS. 1–4 which is of the stainless steel type of construction with a thermoplastic open type handle. While this type, or style, of carafe is preferred, any serving vessel, including the all plastic construction, may also be utilized with this system as long as it has a lid, or stopper cap 24, and some type of handle 20, which is not necessarily limited to the open type as illustrated.

In the preferred embodiment the stopper cap 24 is removably disposed within the vacuum carafe top 26 and consists of an inner cup and an outer ring. The outer ring contains external male threads and a plurality of integral ribs that connect the cup to the ring. This relationship forms a void between the ribs, the inner cup and the outer ring. The ribs extend exclusively between the cup and the ring and are angularly formed on a lower end to offset parallel misalignment of the cup to the ring. A separate cap is snapped onto the stopper inner cup forming a dead air space between the cap and the inner cup creating an insulating barrier. In the preferred embodiment the stopper and cap are formed of a thermoplastic composition.

A liquid sealing gasket is located between the cap and the inner cup assuring a airtight seal therebetween. In addition the gasket creates a sealing surface between the stopper and a mounting ring on the carafe 20, allowing sealing when the stopper is screwed in until the it contiguously engages the ring. When the stopper is unscrewed a horizontal gap is formed between the liquid sealing gasket and the mounting ring. This arrangement provides a passageway through the gap and the void between the ribs permitting a high flow of liquid to pass therethrough onto the pouring spout and out of the carafe 20. While this type of high flow stopper cap 24 has been described above in detail any type of stopper or cap may be an acceptable alternate.

The configuration of the stopper cap 24 is not essential to this invention however the actual color is since a selected identification color represents the contents of the carafe. The color black 28 represents regular coffee, orange color 30 is used for decaffeinated coffee, green color 32 is for the, so called, special blend of coffee, white 34 is used basically for milk and/or cream where the carafe 20 is used as a creamer and brown color 36 represents water. When the stopper cap 24 is fabricated, the color pigment may be added into the formulae at the time the parts are injection molded. An acceptable alternate is painting the outside surface with the designated color after fabrication but before assembly as only the exposed parts are necessarily color coded. Again the specific color selection, identified above, is not a limiting factor in the invention, as any color could be used as long as each liquid to be identified is colored differently.

A removable handle grip 38 and a removable thumb rest 40 are attached to the handle 22 of the vacuum carafe 20 as illustrated in FIGS. 1 through 4. The handle grip 38 and the removable thumb rest 40 have the same selected identification color as the stopper cap 24. This combination of matching color is obviously recognizable from a distance and clearly permits a user to easily identify the contents of the carafe 20. As the removable handle grip 38 and thumb rest 40 are both made of a soft flexible processed rubber in the preferred embodiment, the color pigment may be added at the time of manufacture. If the handle 22 itself is made of thermoplastic and does not use a separate grip 38 and/or thumb rest 40, the same procedure as for coloring the stopper cap 24 may be used.

The last element made used in the carafe content marking system is an identification marker that is attached to the vacuum carafe 20 in the form of a snap-in insert 42. This snap-in insert 42 has the same selected identification color as the stopper cap 24 and further contains indicia designating in writing the contents of the carafe 20. This decisive combination of color and indicia readily indicates, at a casual glance, the type of liquid stored within the carafe. Once the user has become familiar with the combination a glance, the color is all that is needed for instant recognition.

In order to be removable the carafe 20 includes a recess cavity 44 with an indented periphery and a pair of bores therein located adjacent to the handle 22 The snap-in insert 42 includes a pair of fingers 46 that are configured in the shape of the bores with the snap-in insert 42 having the exact opposite shape as the cavity 44, such that the marker may be pressed into the cavity 44, snapped into place and held securely by the indentation of the cavity 44. A tab 48 is molded into the snap-in insert 42 that does not include the indented periphery for ease of removal. The type of material used in the construction of the snap-in insert 42 may be SANTOPRENE™ processed rubber or any type of synthetic rubber or resilient thermoplastic.

The preferable indicia on the snap-in insert 42 is as follows;

The word regular 50 in white on a black background represents regular coffee, illustrated in FIG. 6.

The word decaf 52 in white on an orange background represents decaffeinated coffee, illustrated in FIG. 10.

The word special 54 in white on a green background represents special blend of coffee, illustrated in FIG. 14.

The word skim 56 in black on a white background represents skim milk when the carafe 20 is used as a creamer, illustrated in FIG. 18.

The word lowfat 58 in black on a white background represents lowfat milk when the carafe 20 is used as a creamer illustrated in FIG. 21.

The word whole 60 in black on a white background represents whole milk when the carafe 20 is used as a creamer, illustrated in FIG. 22.

The word half & half 62 in black on a white background represents half cream and half milk when the carafe 20 is used as a creamer, illustrated in FIG. 23.

The word water 64 in white on a brown background representing water, illustrated in FIG. 25.

Again the actual word and color may change for a particular application and still be within the scope of this invention as long as the combination of color and indicia are utilized.

The drawings are so arranged that that the five colors are represented along with the appropriate elements making up the combination. FIGS. 5 through 8 are in the color black 28 for regular coffee, FIGS. 9 through 12 are in the color orange 30 for decaffeinated coffee and FIGS. 13 through 16 are in the color green 32 for special blend coffee. FIGS. 17, 19 and 20 are in the color white 34 for milk. The following figures illustrating the snap-in inserts 42 have a white background color when the carafe 20 is used as a creamer. FIG. 18 indicates skim milk. FIG. 21 designates lowfat milk. FIG. 22 represents whole milk and FIG. 21 is for half cream and half milk. The final color is brown 36 illustrated in FIGS. 24 through 27 symbolizing water.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A carafe content identification marking system for designating the contents of a liquid that is to be contained within a carafe, comprising;
   a high flow counter top vacuum carafe having a handle and a double wall vacuum sealed air space,
   a stopper cap removably disposed within the vacuum carafe top, wherein said cap having a selected identification color representing the contents of the carafe,
   a removable handle grip, attached to the handle of the vacuum carafe said grip having the same selected identification color as the stopper cap,
   a removable thumb rest, attached to the handle of the vacuum carafe said thumb rest having the same selected identification color as the stopper cap, and
   an identification marker attached to the vacuum carafe defined as a snap-in insert having the same selected identification color as the stopper cap, also indicia designating in writing the contents of the carafe, such that the color combination and indicia readily indicates, at a casual glance, the kind of liquid stored within the carafe.

2. The carafe content identification marking system as recited in claim 1 wherein said carafe further comprises, a stainless steel construction and a thermoplastic open kind of handle.

3. The carafe content identification marking system as recited in claim 1 wherein said selected identification color further comprises, black for regular coffee.

4. The carafe content identification marking system as recited in claim 1 wherein said selected identification color further comprises, orange for decaffeinated coffee.

5. The carafe content identification marking system as recited in claim 1 wherein said selected identification color further comprises, green for special blend coffee.

6. The carafe content identification marking system as recited in claim 1 wherein said selected identification color further comprises, white for milk.

7. The carafe content identification marking system as recited in claim 1 wherein said selected identification color further comprises, brown for water.

8. The carafe content identification marking system as recited in claim 1 wherein said removable handle grip further comprises, a soft flexible processed rubber construction.

9. The carafe content identification marking system as recited in claim 1 wherein said removable thumb rest further comprises, a soft flexible processed rubber construction.

10. The carafe content identification marking system as recited in claim 1 further comprising, said carafe having a recess cavity with an indented periphery also a pair of bores therein, and said snap-in insert identification marker having a pair of fingers configured in the shape of the bores with said snap-in insert identification marker having a shape opposed to the cavity such that the marker may be pressed into the cavity and snapped into the cavity periphery.

11. The carafe content identification marking system as recited in claim 1 wherein said identification marker indicia designating in writing the contents of the carafe further comprises, the word regular in white on a black background representing regular coffee.

12. The carafe content identification marking system as recited in claim 1 wherein said identification marker indicia designating in writing the contents of the carafe further comprises, the word decaf in white on an orange background representing decaffeinated coffee.

13. The carafe content identification marking system as recited in claim 1 wherein said identification marker indicia designating in writing the contents of the carafe further comprises, the word special in white on a green background representing special blend of coffee.

14. The carafe content identification marking system as recited in claim 1 wherein said identification marker indicia designating in writing the contents of the carafe further comprises, the word skim in black on a white background representing skim milk.

15. The carafe content identification marking system as recited in claim 1 wherein said identification marker indicia designating in writing the contents of the carafe further comprises, the word lowfat in black on a white background representing lowfat milk.

16. The carafe content identification marking system as recited in claim 1 wherein said identification marker indicia designating in writing the contents of the carafe further comprises, the word whole in black on a white background representing whole milk.

17. The carafe content identification marking system as recited in claim 1 wherein said identification marker indicia designating in writing the contents of the carafe further comprises, the word half & half in black on a white background representing half cream and half milk.

18. The carafe content identification marking system as recited in claim 1 wherein said identification marker indicia designating in writing the contents of the carafe further comprises, the word water in white on a brown background representing water.

19. A carafe content identification marking system for designating the contents of a liquid to be contained within a carafe, comprising;
    a carafe for holding and serving liquids,
    a stopper cap included with the carafe wherein said cap having a selected identification color representing the contents of the carafe,
    a handle grip, attached to an integral handle of the carafe, having the same selected identification color as the stopper cap,
    a thumb rest, attached to an integral handle of the carafe said thumb rest having the same selected identification color as the stopper cap, and
    an identification marker attached to the carafe having the same selected identification color as the stopper cap, also indicia designating in writing the contents of the carafe, such that the color combination and indicia readily indicates, at a casual glance, the kind of liquid stored within the carafe.

* * * * *